(12) United States Patent
Coon et al.

(10) Patent No.: US 6,208,459 B1
(45) Date of Patent: *Mar. 27, 2001

(54) METHOD AND SYSTEM FOR MULTI-SPECTRAL IMAGING IN THE VISIBLE AND INFRARED SPECTRUMS

(75) Inventors: Bryan Coon, Hicksville, NY (US); John F. McGee, III, Allen, TX (US); Neil Sherman, Huntington Bay; Lou Montulli, West Babylon, both of NY (US)

(73) Assignee: Lockheed Martin Corporation, Syosset, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/111,479

(22) Filed: Jul. 8, 1998

Related U.S. Application Data (63) Continuation of application No. 08/563,656, filed on Nov. 28, 1995, now Pat. No. 5,781,336.

(51) Int. Cl.$^7$ .......................... G02B 13/14; G02B 13/18
(52) U.S. Cl. .................. 359/355; 359/356; 359/350; 359/717
(58) Field of Search ...................... 359/355, 356, 359/357, 771, 754

(56) References Cited

U.S. PATENT DOCUMENTS 3,567,304   3/1971   Kruger .................................... 350/2

(List continued on next page.)

FOREIGN PATENT DOCUMENTS

| 0 467 240 A1 | 1/1992 | (EP) ........................................ 13/14 |
| 0 683 411 A1 | 11/1995 | (EP) . |

OTHER PUBLICATIONS

Born, M., et al., *Principles of Optics*, 6th ed., Pergamon Press, Elmsford, NY, 1980, pp. 235–237.

Dialog File 348 (European Patents) English Language Patent Abstract for EP 0683411 A1, Published Nov. 22, 1995, Base 1.

*Primary Examiner*—Audrey Chang
(74) *Attorney, Agent, or Firm*—Sterne, Kessler, Goldstein, & Fox, PLLC

(57) ABSTRACT

Multi-spectral images are detected using a refractive objective lens system. Magnesium oxide (MgO) and calcium fluoride (CaF$_2$) lenses are used to image scenes in both the visible and infra-red (IR) spectrums. The inventors have discovered that the combination of magnesium oxide, only recently made available in a pure crystal form, and calcium fluoride can be used to fabricate an objective lens for imaging objects in both the visible and infra-red spectrums. Moreover, the combination of magnesium oxide and calcium fluoride results in a super-achromatic condition across visible and infra-red spectrums. This chromatically-corrected spectral range includes wavelengths between 0.4 and 5.9 microns which covers medium-wave IR (MWIR), short-wave IR (SWIR), and the near-IR/visible windows. Combinations of MgO and CaF$_2$ lenses are used in different compound objective lens designs including doublet, Petzval, inverted telephoto, and telephoto arrangements. Visible and/or IR applications for the multi-spectral objective lens system include telescopes, reconnaissance planes, satellites, forward-looking IR (FLIR) and staring sensor systems, night-vision goggles, and other optic and/or electro-optic detection systems.

14 Claims, 5 Drawing Sheets

U.S. PATENT DOCUMENTS

| | | | |
|---|---|---|---|
| 3,622,218 | 11/1971 | Kruger | 350/2 |
| 4,013,796 | 3/1977 | Swinehart et al. | 423/490 |
| 4,349,249 | 9/1982 | Brixner et al. | 350/483 |
| 4,436,363 | 3/1984 | Steinbruegge et al. | 350/1.6 |
| 4,537,464 | 8/1985 | Boutellier | 350/1.4 |
| 4,832,451 | 5/1989 | Trescott | 350/321 |
| 4,884,137 | 11/1989 | Hanson et al. | 358/108 |
| 4,914,287 | 4/1990 | Savoca | 250/216 |
| 4,934,801 | 6/1990 | Mercado | 350/572 |
| 4,995,684 | 2/1991 | Tustison et al. | 350/1.6 |
| 5,067,781 | 11/1991 | Montanari et al. | 359/350 |
| 5,142,409 | 8/1992 | Hanzawa et al. | 359/355 |
| 5,198,924 | 3/1993 | Jansson | 359/350 |
| 5,243,458 | 9/1993 | Hatano et al. | 359/359 |
| 5,305,138 | 4/1994 | Freedenberg et al. | 359/355 |
| 5,781,336 | * 7/1998 | Coon et al. | 359/355 |

* cited by examiner

METHOD AND SYSTEM FOR MULTI-SPECTRAL IMAGING IN THE VISIBLE AND INFRARED SPECTRUMS

This application is a continuation of application Ser. No. 08/563,656, filed Nov. 28, 1995, now U.S. Pat. No. 5,781,336.

BACKGROUND OF THE INVENTION

1. Field of the Invention

The present invention relates to the field of optics. More specifically, the present invention provides a multi-spectral objective using a combination of magnesium oxide and calcium fluoride lenses to image visible and infrared wavelengths.

2. Related Art

Many imaging applications such as air-borne reconnaissance and tracking systems demand detection in both visible and infra-red spectrums. Typically, separate objectives must be used because no single objective lens system can accommodate multi-spectral images at both visible and infra-red wavelengths with adequate resolution. In particular, conventional refractive IR objectives disperse visible light, thereby, degrading image quality. Increasingly industry has been forced to less desirable reflective-type IR objectives.

What is needed is an objective lens system using refractive components that provides high-quality multi-spectral imaging in both visible and infrared spectrums.

SUMMARY OF THE INVENTION

The present invention is directed to a multi-spectral objective lens system. Two materials are used to fabricate lenses in the objective lens system: magnesium oxide (MgO) and calcium fluoride ($CaF_2$). According to a first embodiment of the invention, a magnesium oxide lens and a calcium fluoride lens, in any order, form a doublet which images wavelengths in the visible and infra-red spectrums. Further embodiments include combinations of MgO and $CaF_2$ lenses in different objective lens designs including Petzval, inverted telephoto, and telephoto arrangements.

Thus, the inventors have discovered that the combination of magnesium oxide, only recently made available in a pure crystal form, and calcium fluoride can be used to fabricate an objective lens for imaging objects in both the visible and infra-red spectrums. The combination of magnesium oxide and calcium fluoride results in a super-achromatic condition, that is color correction across the visible and infra-red spectrums. This chromatically-corrected spectral range includes wavelengths between approximately 0.4 and 5.9 microns which covers medium-wave IR (MWIR), short-wave IR (IR), and the near-IR/visible windows.

The objective lens according to the present invention is well-suited for telescopes, reconnaissance planes, satellites, forward-looking IR (FLIR) and staring sensor systems, night-vision goggles, and other optic and/or electro-optic detection systems in visible and/or IR applications.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers typically indicate identical or functionally similar elements. Additionally, the left-most digit(s) of a reference number identifies the drawing in which the reference number first appears.

In the Drawings.

DETAILED DESCRIPTION OF THE PREFERRED EMBODIMENTS

Overview

The present invention is directed to a multi-spectral objective lens system. Two materials are used to fabricate lenses in the objective lens system: magnesium oxide (MgO) and calcium fluoride ($CaF_2$). A doublet consisting of a first lens formed from magnesium oxide and a second lens formed from calcium fluoride images wavelengths in the visible and infra-red spectrums. Combinations of MgO and $CaF_2$ lenses are used in different compound objective lens designs including Petzval, inverted telephoto, and telephoto arrangements. Previously, there has been no suggestion of using both MgO and $CaF_2$ lenses in a multi-spectral lens combination. The two materials were incompatible for forming a common objective lens system imaging visible and IR light. Magnesium oxide was practically limited to IR light. For example, MgO produced in a hot press form by Kodak under the trade name IRTRAN 5 lacks sufficient homogeneity or clarity for use in the visible spectral range. Magnesium oxide only recently has been made available in a pure crystal form. For example, Commercial Crystal Laboratories, Inc., a Florida corporation, now supplies MgO crystals. The inventors have discovered that such a MgO crystal can be used as an optics material for imaging visible and IR light.

The inventors have further discovered that the combination of magnesium oxide and calcium fluoride, in any order, can be used to fabricate an objective lens for imaging objects in both the visible and infra-red spectrums. The inventors found based on the Abbe values for MgO and $CaF_2$ lenses that a super-achromatic condition is achieved for this combination of materials superior to other combinations of lens material. The Abbe value is a constant of an optical medium that describes the ratio of refractivity to dispersion. A difference in this ratio is necessary to achieve an achromatic condition. Two materials having a large difference in the Abbe value is an advantage in achieving an achromatic condition. The inventors computed an Abbe value for MgO and $CaF_2$ lenses for three spectrums, 0.4–0.7, 1.4–2.2, and 3.4 to 5.0 microns. The computed Abbe values for the three spectrums indicates that a super-achromatic condition is achieved by the MgO and $CaF_2$ combination which achromatizes all three spectrums simultaneously.

Thus, the inventors have discovered that the combination of magnesium oxide and calcium fluoride results in a super-achromatic condition, that is color correction across the visible and infra-red spectrums. This chromatically-corrected spectral range includes wavelengths between approximately 0.4 and 5.9 microns, and in particular, between 0.55 and 5.35 microns, which covers medium-wave IR (MWIR), short-wave IR (IR), and near-IR/visible windows.

The objective lens according to the present invention is well-suited for telescopes, reconnaissance planes, satellites, forward-looking IR (FLIR) and staring sensor systems, night-vision goggles, and other optic and/or electro-optic detection systems in visible and/or IR applications.

Doublet Lens Design

Figure 1:
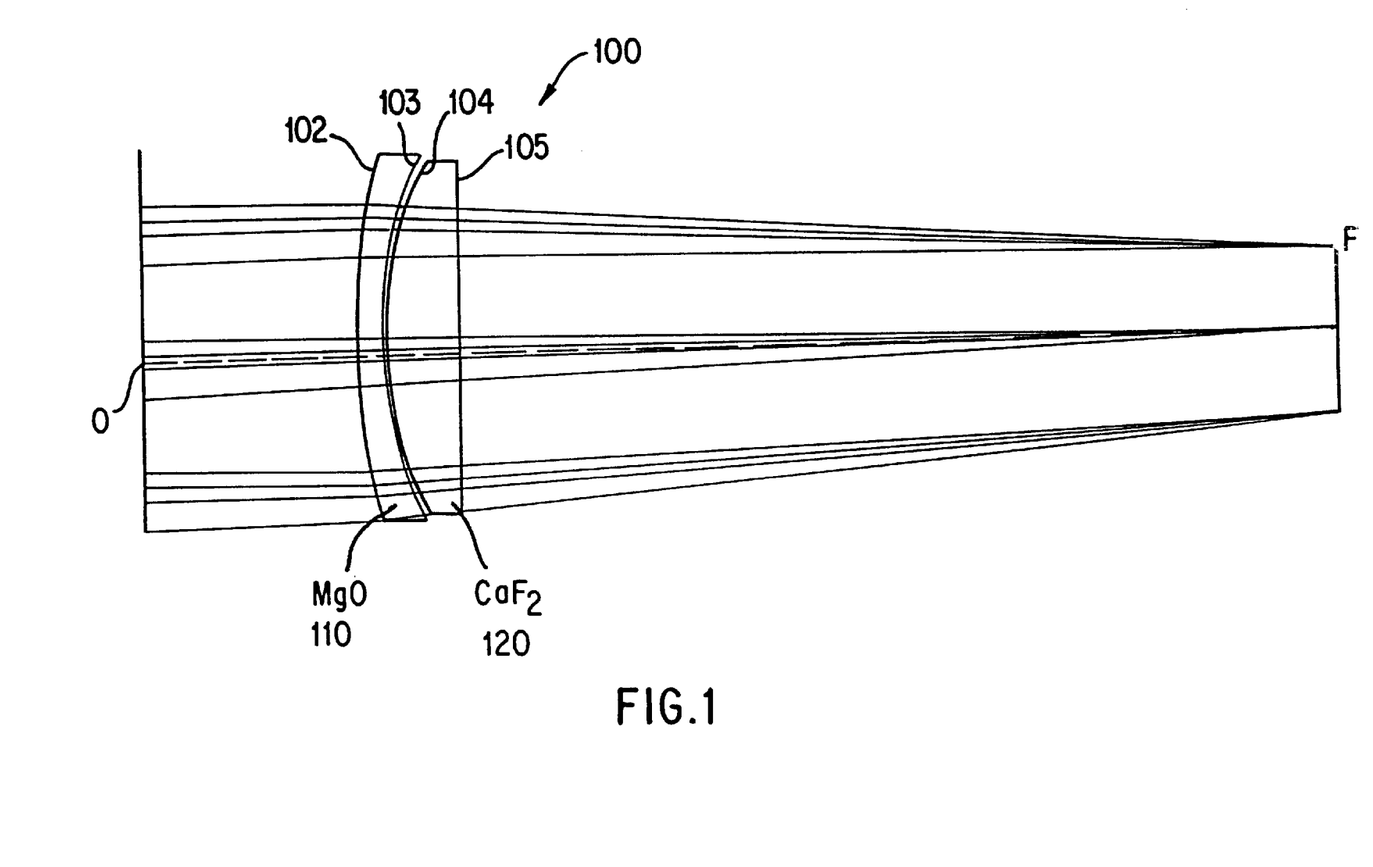
FIG. 1 is a multi-spectral objective lens system in a doublet arrangement according to a first embodiment the present invention.

FIG. 1 illustrates an objective lens system 100 according to a first embodiment of the present invention. Objective lens system 100 provides multi-spectral imaging in both the visible and infra-red spectrums. The objective lens system 100 consists of a first lens element 110 and a second lens element 120. The first and second lens elements 110 and 120 are arranged to form a doublet, i.e. a classic flint forward doublet, disposed along a common optical axis O. The doublet focuses multiple wavelengths at a common focal plane F. The first lens element 120 is made of magnesium oxide (MgO), i.e. a MgO crystal. The second lens element 130 is made of calcium fluoride ($CaF_2$).

As discussed above, the objective lens system 100 provides a super-achromatic condition for visible through infra-red wavelengths including, but not limited to, the range between 0.4 and 5.9 $\mu$m. The prescription for one example of objective lens system 100 is compiled in Table 1 below. In this example, the effective focal length is 12.0034 inches, the f-number (F/#) is 9.3605, and the field of view angle is four degrees. The conic constant equals zero. The index of refraction for the MgO material ranges from 1.7405 to 1.6240 for wavelengths between 0.55 to 5.35 $\mu$m (inclusive). The index of refraction for the $CaF_2$ material ranges from 1.4348 to 1.39460 for wavelengths between 0.55 to 5.35 $\mu$m (inclusive).

TABLE 1

| Surface | Radius (in.) | Thickness (in.) | Material | Diameter (in.) |
|---|---|---|---|---|
| 102 | 3.377785 | 0.1330925 | MgO | 1.756062 |
| 103 | 2.155341 | 0.01330925 | air | 1.707015 |
| 104 | 2.086584 | 0.3327312 | $CaF_2$ | 1.709893 |
| 105 | 134.0277 | 4 | air | 1.685772 |

Petzval Type Lens Design

Figure 2:
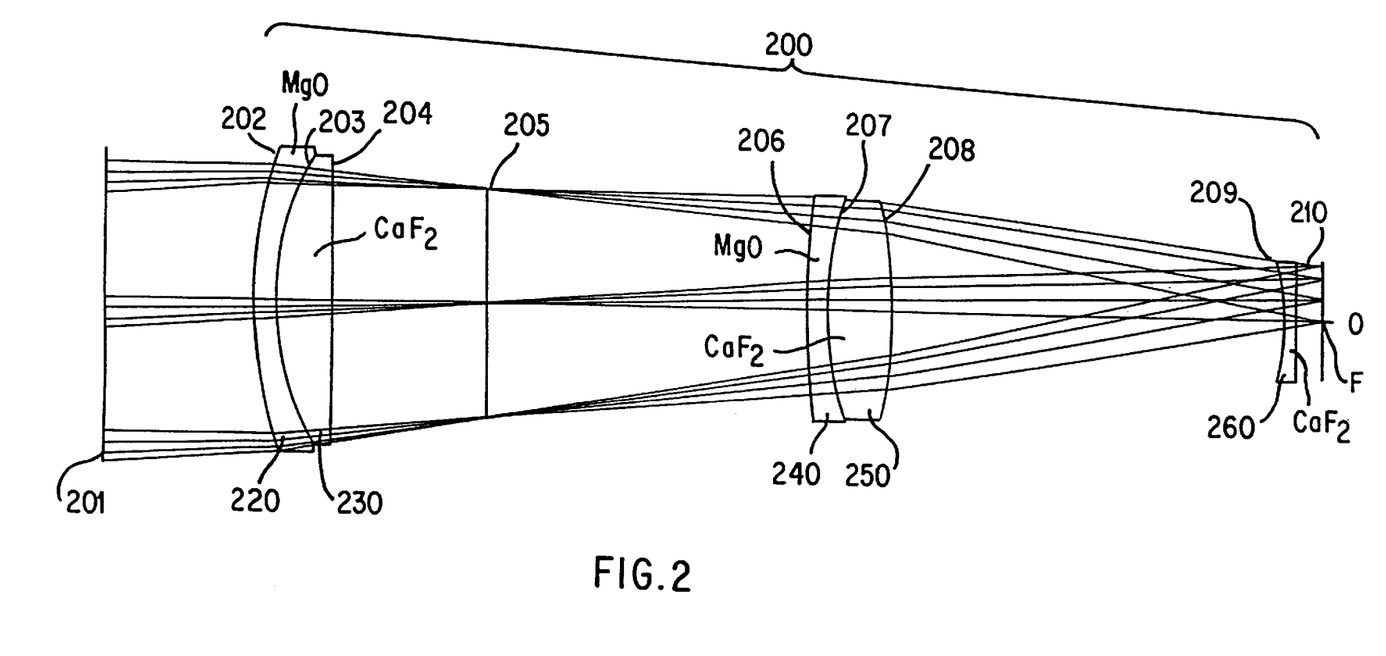
FIG. 2 is a multi-spectral objective lens system in a Petzval arrangement according to a second embodiment of the present invention.

FIG. 2 illustrates an objective lens system 200 according to a second embodiment of the present invention. Objective lens system 200 is arranged in a Petzval type of lens design and provides multi-spectral imaging in both the visible and infra-red spectrums. The objective lens system 200 includes first through fifth lens elements, 220 to 260, disposed along a common optical axis O. In one doublet, first lens element 220 is made of magnesium oxide (MgO). The second lens element 230 is made of calcium fluoride ($CaF_2$). Likewise, in a second doublet, third lens element 240 is made of MgO and fourth lens element 250 is made of $CaF_2$. A stop or physical aperture 205 is included between the two doublets, that is between lens elements 230 and 240. An additional fifth lens element 260 is added to flatten the typically curved Petzval focal plane.

As discussed above, the objective lens system 200 provides a super-achromatic condition for visible and infra-red wavelengths. This includes, but is not limited to, the range between 0.4 and 5.9 $\mu$m. The prescription for one example of objective lens system 200 is compiled in Table 2 below.

In this example, the effective focal length is 5.2894 inches, the f-number (F/#) is 3.2057, and the field of view angle is eight degrees. The conic constant equals zero except for surface 209 which has a constant equal to −5.7132. The index of refraction for the MgO material ranges from 1.7405 to 1.6240 for wavelengths between 0.55 to 5.35 $\mu$m (inclusive). The index of refraction for the $CaF_2$ material ranges from 1.4348 to 1.39460 for wavelengths between 0.55 to 5.35 $\mu$m (inclusive).

TABLE 2

| Surface | Radius (in.) | Thickness (in.) | Material | Diameter (in.) |
|---|---|---|---|---|
| 202 | 2.75 | 0.1466 | MgO | 1.84982 |
| 203 | 1.689 | 0.3666 | $CaF_2$ | 1.76331 |
| 204 | −25.709 | 0.98825 | | 1.74089 |
| 205 | infinity | 2.073 | | 1.405998 |
| 206 | 4.289 | 0.1466 | MgO | 1.383331 |
| 207 | 1.9617 | 0.43995 | $CaF_2$ | 1.354132 |
| 208 | −2.925 | 2.529 | | 1.347788 |
| 209 | −1.1957 | 0.0733 | $CaF_2$ | 0.7366471 |
| 210 | infinity | 0.1787855 | | 0.73747998 |

Inverted Telephoto Type Lens Designs

Figure 3:
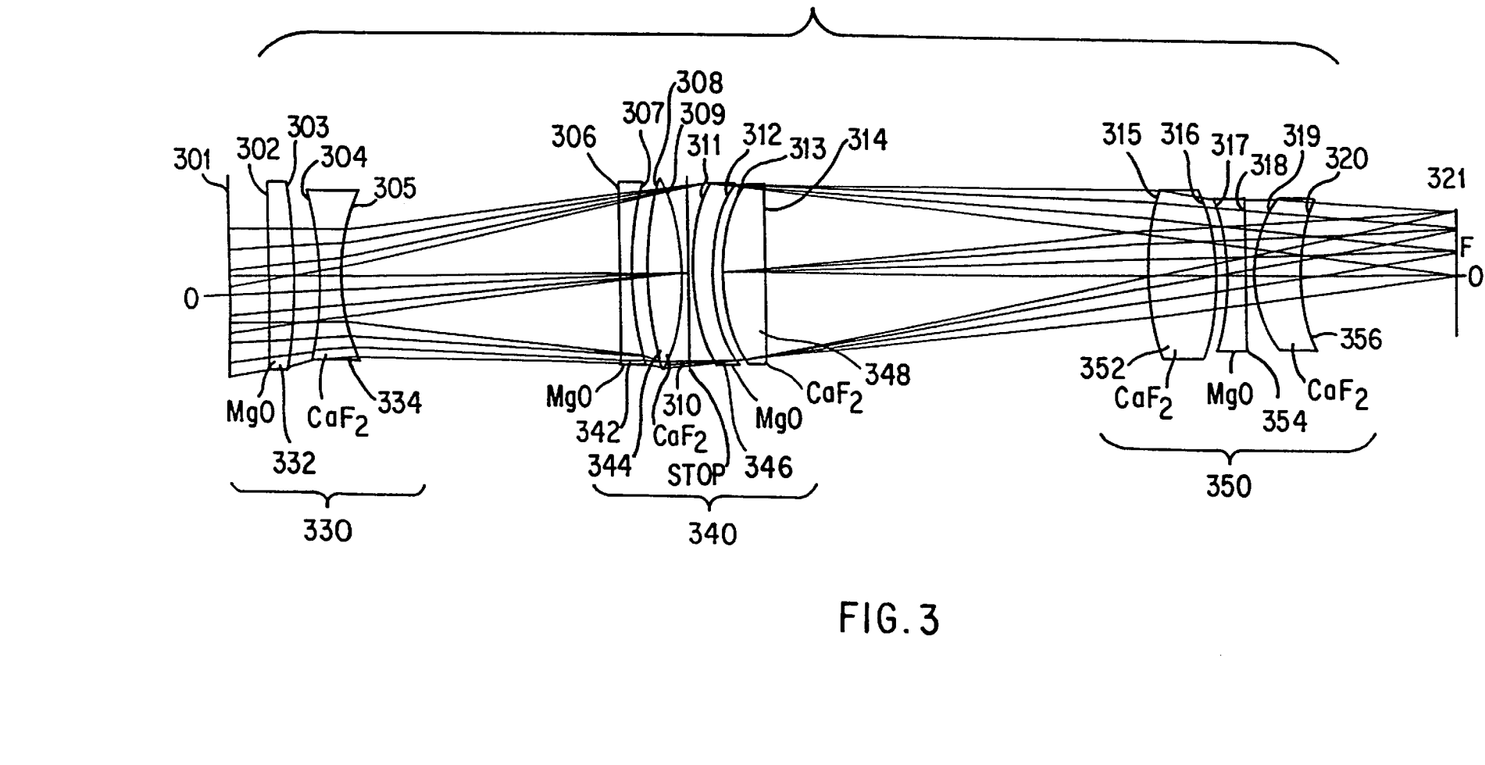
FIG. 3 is a multi-spectral objective lens system in an inverted telephoto arrangement according to a third embodiment of the present invention.

FIG. 3 illustrates an objective lens system 300 according to a third embodiment of the present invention. Objective lens system 300 is arranged in an inverted telephoto type of lens design and provides multi-spectral imaging in both the visible and infra-red spectrums. The objective lens system 300 includes three lens groupings 330, 340, and 350.

These three groups include first through ninth lens elements, 332, 334, 342, 344, 346, 348, 352, 354, and 356 disposed along a common optical axis O.

In the first group 330, first lens element 332 is made of magnesium oxide (MgO) and the second lens element 334 is made of calcium fluoride ($CaF_2$). Likewise, in the second group 340, third and fifth lens elements 342, 346 are made of MgO. Fourth and sixth lens elements 344, 348 are made of $CaF_2$. In the third group 350, the seventh and ninth lens elements 352, 356 are made of $CaF_2$ and surround the eighth lens element 354 made of MgO. A stop or physical aperture 310 is included between the two doublets, that is between fourth and fifth lens elements 344 and 346 as shown.

As discussed above, the objective lens system 300 provides a super-achromatic condition for visible and infra-red wavelengths. This includes, but is not limited to, the range between 0.4 and 5.9 $\mu$m. The prescription for one example of objective lens system 300 is compiled in Table 3 below. In this example, the effective focal length is 6.0676 inches, the f-number (F/#) is 3.7923, and the field of view angle is 22 degrees. The conic constant equals zero. The index of refraction for the MgO material ranges from 1.7405 to 1.6240 for wavelengths between 0.55 to 5.35 $\mu$m (inclusive). The index of refraction for the $CaF_2$ material ranges from 1.4348 to 1.39460 for wavelengths between 0.55 to 5.35 $\mu$m (inclusive).

TABLE 3

| Surface | Radius (in.) | Thickness (in.) | Material | Diameter (in.) |
|---|---|---|---|---|
| 302 | infinity | 0.48 | MgO | 3.295302 |
| 303 | −12.37896 | 0.5019428 | | 3.211953 |
| 304 | −5.121251 | 0.3428571 | $CaF_2$ | 2.978004 |
| 305 | 3.45979 | 5.023917 | | 2.798337 |
| 306 | −114.467 | 0.2742857 | MgO | 3.164553 |
| 307 | 6.720905 | 0.2468571 | | 3.191547 |
| 308 | 5.813471 | 0.6171428 | $CaF_2$ | 3.335289 |
| 309 | −4.305556 | 0.1028571 | | 3.34016 |

TABLE 3-continued

| Surface | Radius (in.) | Thickness (in.) | Material | Diameter (in.) |
|---|---|---|---|---|
| 310 | infinity | 0.1028571 | | 3.26582 |
| 311 | 3.75086 | 0.3428571 | MgO | 3.188348 |
| 312 | 2.80682 | 0.2057143 | | 3.036389 |
| 313 | 3.050408 | 0.7542857 | $CaF_2$ | 3.13994 |
| 314 | 66.94763 | 6.843282 | | 3.129624 |
| 315 | 4.348838 | 1.234286 | $CaF_2$ | 2.962569 |
| 316 | −4.054665 | 0.2057143 | | 2.794528 |
| 317 | −3.500591 | 0.2742857 | MgO | 2.654563 |
| 318 | 19.01012 | 0.2057143 | | 2.642477 |
| 319 | 2.378518 | 0.8228571 | $CaF_2$ | 2.680185 |
| 320 | 2.621247 | 2.898204 | | 2.432032 |

Figure 4:
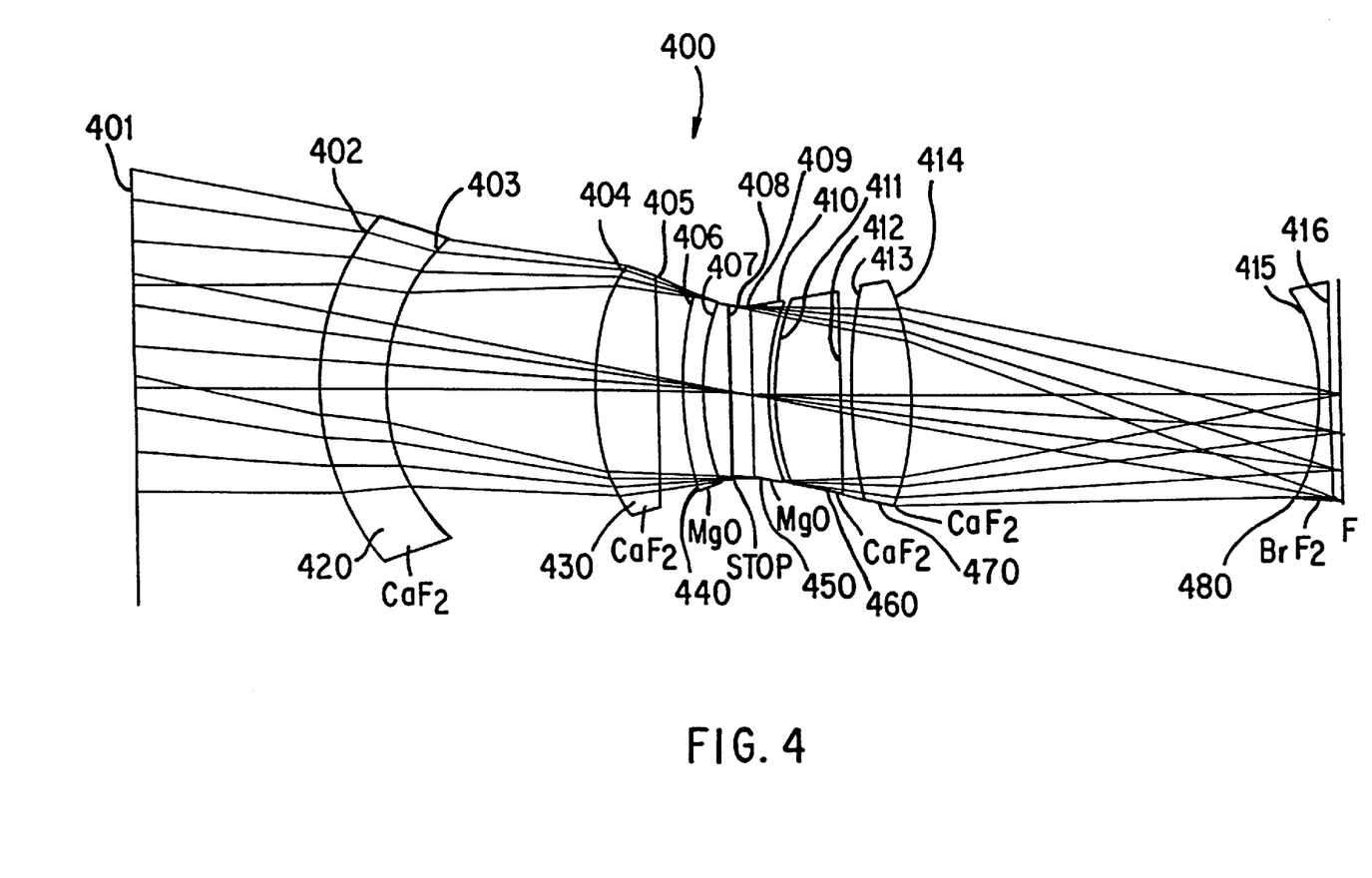
FIG. 4 is a multi-spectral objective lens system in an inverted telephoto arrangement according to a fourth embodiment of the present invention.

FIG. 4 illustrates an objective lens system 400 according to a fourth embodiment of the present invention. Objective lens system 400 is arranged in another inverted telephoto type of lens design and provides multi-spectral imaging in both the visible and infra-red spectrums. The objective lens system 400 includes first through seventh lens elements, 420 to 480 disposed along a common optical axis O. First, second, fifth, and sixth lens elements, 420, 430, 460, and 470, respectively, are made of $CaF_2$. Inner third and fourth lens elements 440, 450 are made of MgO. The seventh lens element 480 is made of barium fluoride ($BrF_2$).

A stop or physical aperture 408 is included between the two MgO lens elements 440, 450 as shown. The first lens element 420 and the seventh lens element 480 combine to produce an anastiginatic image across the field.

As discussed above, the objective lens system 400 provides a super-achromatic condition for visible and infra-red wavelengths. This includes, but is not limited to, the range between 0.4 and 5.9 μm. The prescription for one example of objective lens system 400 is compiled in Table 4 below. In this example, the effective focal length is 6.1421 inches, the f-number (F/#) is 2.7298, and the field of view angle is 22 degrees. The conic constant equals zero except for surface 415 which has a constant equal to −0.4. The index of refraction for the MgO material ranges from 1.7405 to 1.6240 for wavelengths between 0.55 to 5.35 μm (inclusive). The index of refraction for the $CaF_2$ material ranges from 1.4348 to 1.39460 for wavelengths between 0.55 to 5.35 μm (inclusive).

TABLE 4

| Surface | Radius (in.) | Thickness (in.) | Material | Diameter (in.) |
|---|---|---|---|---|
| 402 | 2.844668 | 0.7 | $CaF_2$ | 3.700449 |
| 403 | 2.202348 | 2.2 | | 3.182788 |
| 404 | 2.341079 | 0.7136391 | $CaF_2$ | 2.664106 |
| 405 | −75.59034 | 0.2721544 | | 2.497632 |
| 406 | 4.14811 | 0.2 | MgO | 2.12412 |
| 407 | 2.736832 | 0.3 | | 1.928946 |
| 408 | infinity | 0.2391751 | | 1.873357 |
| 409 | 141.6627 | 0.2 | MgO | 1.88868 |
| 410 | 3.109891 | 0.05 | | 1.959391 |
| 411 | 2.938415 | 0.72 | $CaF_2$ | 2.031865 |
| 412 | 173.6085 | 0.1 | | 2.229428 |
| 413 | 4.914444 | 0.7 | $CaF_2$ | 2.358269 |
| 414 | −3.305643 | 4.364573 | | 2.425191 |
| 415 | −2.049313 | 0.1 | Barium Fluoride | 2.245672 |
| 416 | infinity | 0.09370708 | | 2.392193 |

Telephoto Type Lens Design

Figure 5:
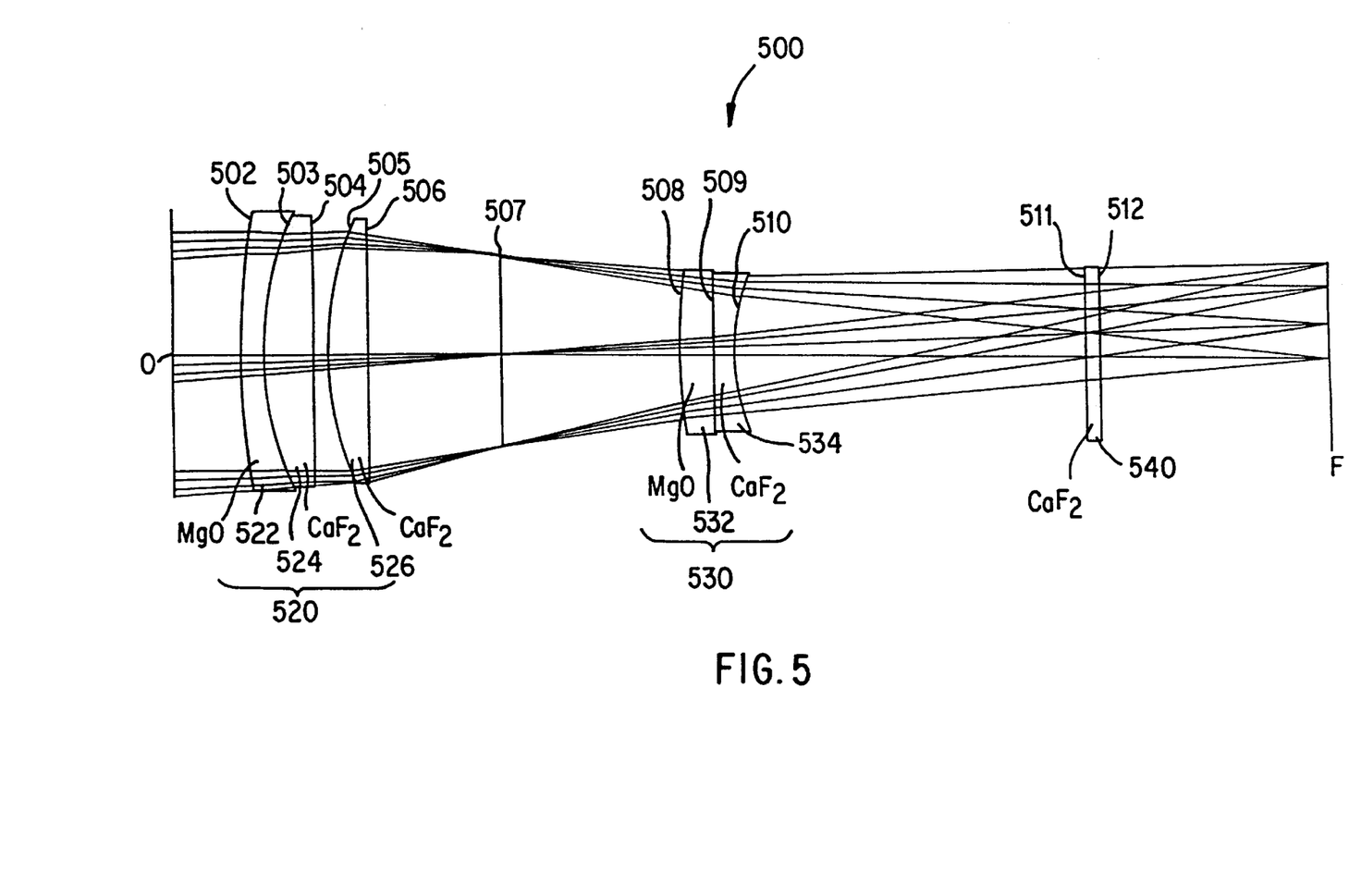
FIG. 5 is a multi-spectral objective lens system in a telephoto arrangement according to a fifth embodiment of the present invention.

FIG. 5 illustrates an objective lens system 500 according to a fifth embodiment of the present invention. Objective lens system 500 is arranged in a telephoto type of lens design and provides multi-spectral imaging across the visible and infra-red spectrums. The objective lens system 500 includes three lens groupings 520, 530, and 540. These three groups include first through sixth lens elements, 524, 526, 532, 534, and 540 disposed along a common optical axis O.

In the first group 520, the first lens element 522 is made of magnesium oxide (MgO). The second and third lens elements 524, 526 are made of calcium fluoride ($CaF_2$). In the second group 530, fourth and fifth lens elements 532, 534 are made of MgO and $CaF_2$, respectively. The third group 540 consists of a single $CaF_2$ lens element 540. A stop or physical aperture 507 is included between the first two lens groupings 520, 530 that is between third and fourth lens elements 526 and 532 as shown.

As discussed above, the objective lens system 500 provides a super-achromatic condition for visible and infra-red wavelengths. This includes, but is not limited to, the range between 0.4 and 5.9 μm. The prescription for one example of objective lens system 500 is compiled in Table 5 below. In this example, the effective focal length is 9.1667 inches, the f-number (F/#) is 5.5556, and the field of view angle is eight degrees. The conic constant equals zero for all surfaces except for surface 511 where the conic constant equals −5.7132. The index of refraction for the MgO material ranges from 1.7405 to 1.6240 for wavelengths between 0.55 to 5.35 μm (inclusive). The index of refraction for the $CaF_2$ material ranges from 1.4348 to 1.39460 for wavelengths between 0.55 to 5.35 μm (inclusive).

TABLE 5

| Surface | Radius (in.) | Thickness (in.) | Material | Diameter (in.) |
|---|---|---|---|---|
| 502 | 7.320726 | 0.1466 | MgO | 1.92148 |
| 503 | 2.187264 | 0.3666 | $CaF_2$ | 1.865819 |
| 504 | −15.85229 | 0.1 | | 1.859174 |
| 505 | 2.269012 | 0.3 | $CaF_2$ | 1.820605 |
| 506 | −345.7257 | 1.0 | | 1.784194 |
| 507 | infinity | 1.3 | | 1.30319 |
| 508 | 4.696846 | 0.25 | MgO | 1.127906 |
| 509 | 17.5268 | 0.15 | $CaF_2$ | 1.088754 |
| 510 | 1.376359 | 2.529 | | 1.040998 |
| 511 | infinity | 0.1 | $CaF_2$ | 1.182727 |
| 512 | infinity | 1.756735 | | 1.186851 |

Tables 1 to 5 provide specific prescription data in examples of objective lenses systems 100 to 500. It would be apparent to one skilled in the art given this description that different values can be substituted within design tolerance limits.

Simulations testing each of the above objective lens systems 100 to 500 in a range from 0.55 to 5.35 μm. indicate high image-quality performance is achieved beyond commercial design expectation limits for visible and IR objectives. The paraxial focal chromatic shift is on the order (i.e. within a factor of 2) of the diffraction limit. Likewise, the diffraction encircled energy is nearly diffraction limited. The fraction of encircled energy for various field points is on the order of the maximum diffraction limit (i.e. within a factor of 2)—even for radii less than 6 microns. Finally, the modulus of the optical transfer function (MTF) taken over the 0.55 to 5.35 μm. range demonstrates a quality image is obtained. For example, the MTF for various field points remained greater than 0.1 even at a spatial frequency of 100 cycles per millimeter.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A multi-spectral objective lens system for imaging light in a wavelength range which includes visible and infrared wavelengths, consisting of:

a doublet; wherein said doublet consists of:

a first lens made of magnesium oxide; and a second lens made of calcium fluoride, wherein said first lens and said second lens focus light in a wavelength range that includes visible and infrared wavelengths at a common focal plane.

2. The system of claim 1, wherein the wavelength range includes approximately 0.55 to 5.35 μm wavelengths.

3. The system of claim 1, wherein the wavelength range includes medium-wave infra-red, short-wave infra-red, near-infra-red, and visible wavelengths.

4. The system of claim 1, wherein said wavelength range consists of visible and infra-red light.

5. The system of claim 1, wherein said first lens and said second lens chromatically correct visible and infra-red light.

6. The system of claim 1, wherein, said index of refraction for said magnesium oxide in said first lens is within a range of approximately 1.7 to 1.6 for wavelengths of light at or between approximately 0.55 to 5.35 μm, and said index of refraction for said calcium fluoride in said second lens is within a range from approximately 1.4 to 1.3 for wavelengths of light at or between approximately 0.55 to 5.35 μm.

7. The system of claim 1, wherein a first surface of said first lens has a first radius and a first surface of said second lens has a second radius, and the ratio of said first radius to said second radius is approximately 1.6.

8. The system of claim 1, wherein said objective lens system is included in a compound objective lens assembly.

9. The system of claim 1, wherein said doublet comprises a classic flint forward doublet arrangement.

10. The system of claim 1, wherein said first lens is made of a substantially pure magnesium oxide crystal.

11. The system of claim 1, wherein said first lens and said second lens are disposed along a common optical axis between an object side and a focal plane side, said first lens being disposed between said object side and said second lens.

12. The system of claim 1, wherein said first lens and said second lens are disposed along a common optical axis between an object side and a focal plane side, said first lens being disposed between said second lens and said focal plane side.

13. A method for detecting visible and infra-red images comprising the steps of:

optically coupling only a magnesium oxide lens and a calcium fluoride lens; and focusing light passing through said magnesium oxide lens and said calcium fluoride lens at a common focal plane for light in a wavelength range including visible and infra-red wavelengths to obtain visible and infra-red images.

14. The method of claim 13, further comprising the step of chromatically correcting said light passing through said t least one magnesium oxide and calcium fluoride lenses.

* * * * *